United States Patent [19]
Erickson et al.

[11] Patent Number: 5,581,802
[45] Date of Patent: Dec. 3, 1996

[54] METHOD FOR PROVIDING SERVICE ACCESS INFORMATION IN A COMMUNICATION SYSTEM

[75] Inventors: Paul M. Erickson, Hanover Park; Kenneth J. Crisler, Wheaton; Garry C. Hess, Elgin; Stuart W. Thro, Cary, all of Ill.

[73] Assignee: Motorola, Inc., Schaumburg, Ill.

[21] Appl. No.: 648,476

[22] Filed: Jan. 31, 1991

[51] Int. Cl.⁶ .................................................. H04B 1/00
[52] U.S. Cl. ...................... 455/33.1; 455/54.2; 379/59
[58] Field of Search ............................ 455/33, 34, 54, 455/56, 62, 89, 186, 33.1, 33.2, 33.4, 54.1, 54.2, 56.1; 379/58, 59, 63

[56] References Cited

U.S. PATENT DOCUMENTS

| | | | |
|---|---|---|---|
| 4,012,597 | 3/1977 | Lynk, Jr. et al. | 455/54 |
| 4,829,554 | 5/1989 | Barnes et al. | 455/33 |
| 5,093,926 | 3/1992 | Sasuta | 455/34 |
| 5,301,359 | 4/1994 | Van den Heuvel et al. | 455/33.1 |

OTHER PUBLICATIONS

Contel, Oct. 1987, pp. 13, 15 and 19, Contenental Telephon Company of Virginia.
Proposal–Straw Man For Automatic Roaming, Electronic Industries Association, TR–45.2 Cellular System Operation, Working Group II Jun. 18, 1985.

*Primary Examiner*—Andrew Faile
*Attorney, Agent, or Firm*—Susan L. Lukasik

[57] ABSTRACT

A method of providing a radio communication unit (120) with information regarding radio communication services. The radio communication unit transmits a request regarding availability of one or more specific radio communication services. The radio communication unit then receives information regarding availability of the specified radio communication services.

15 Claims, 3 Drawing Sheets

METHOD FOR PROVIDING SERVICE ACCESS INFORMATION IN A COMMUNICATION SYSTEM

FIELD OF THE INVENTION

This invention relates generally to RF communication systems, including but not limited to methodologies that permit a communication unit to access a plurality of communication services.

BACKGROUND OF THE INVENTION

RF communication systems are well understood in the art. Such systems provide a wide variety of communication services including group voice communications, telephone interconnect, and data communications among many others. It is typical for any given RF communication system to only provide a subset of all possible communication services based on cost, available RF bandwidth, and other factors. Further, within an RF communication system encompassing multiple communication sites, all of the communication services provided by the system may not be available at all sites or at a given site all of the time.

A communication unit, operating in an RF communication system as described, may from time to time request certain communication services. Generally, if the requested service is not available, the request is denied. The user of the communication unit may then choose to repeat the request in other locations or at another time in hopes of gaining access to the requested communication service. It is possible that a large number of subsequent requests may be required before the user succeeds, if in fact success is ever achieved. This process wastes communication resources for the failed service requests, and also contributes to frustration for the user trying to access the communication system.

It should be noted that some prior art communication systems provide for special responses to users when the requested service is only temporarily unavailable. However, these methods apply only to the special case of services that are unavailable for a substantially short period of time.

DESCRIPTION OF A PREFERRED EMBODIMENT

Figure 1:
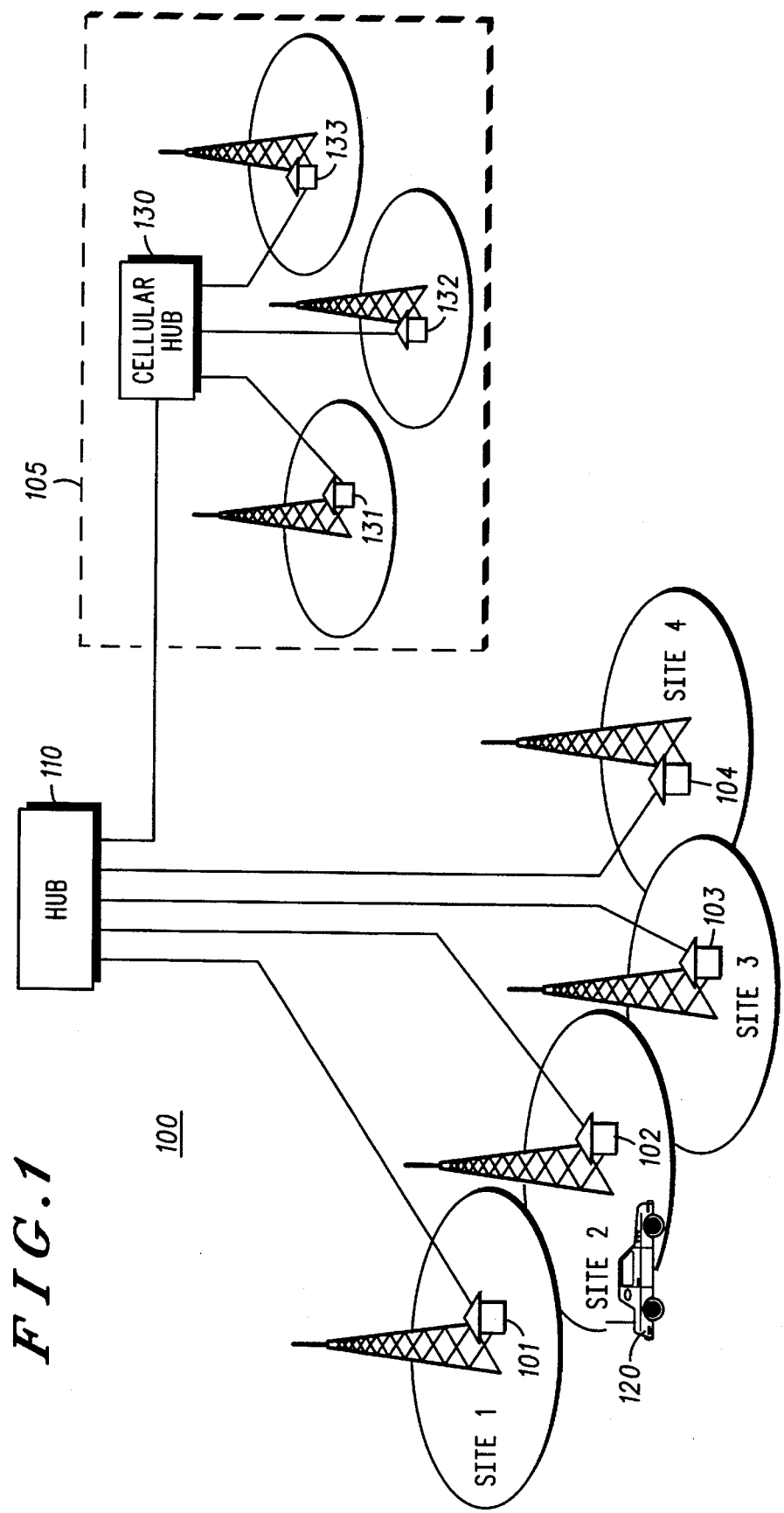
FIG. 1 comprises a block diagram of an RF communication system utilizing the principles of the present invention.

Referring to FIG. 1, a communication system exemplifying the principles of the present invention can be seen as generally depicted by the numeral 100. The communication system (100) provides communication services to communication units (120) from a plurality of communication sites (101–105). These communication sites (101–105) may comprise a variety of communication configurations including simple RF repeater installations or substantially independent radio systems such as a cellular system (105) that may itself also include further subordinate communication sites (131–133). Further, these communication sites (101–105) may be located in generally the same area or substantially distant from each other. Each communication site provides communication coverage for a limited geographic area. Generally the communication coverage comprises providing user communication services, including voice, data, video, or other communications, and control data communication capability to the communication units (120). The particular communication services available at each of the communication sites (101–105) will differ according to the equipment installed at each site and the priority assigned to different services as well as other appropriate factors. Further, the communication services available at a particular communication site will typically differ over time for similar reasons.

The communication messages within the system (100) comprise inbound and outbound user and control messages that are communicated on radio frequency (RF) communication channels. The inbound and outbound control messages may comprise such messages as communication service request, communication service grant, communication service availability inquiry, and other messages that facilitate orderly communication within the system (100). The user messages comprise voice, data, video or other messages communicated between the users of the communication units (120).

As described herein, a communication unit (120) may be either a mobile or a portable radio communication device. Communication units (120) may be found at various times in different geographical locations, and hence within range of various communication sites (101–105). For example, as depicted in FIG. 1, the communication unit (120) could have access to communication site 2 (102). Accordingly, the communication unit (120) could have access to the communication services offered by that communication site (102) but could not have access to services offered uniquely by one of the other communication sites (101,103, 104). For example, assume that the user of the communication unit (120) desires to send a video message and only communication site 4 (104) is capable of providing video communication services. At his current location, the user of the communication unit cannot obtain the desired service. The present invention provides a method whereby the user of the communication unit (120) is provided with information regarding the availability of such communication services as are not currently available to the unit.

In one embodiment of the invention, the availability information can be provided through the provision of a hub (110) that connects to each communication site (101–105) as shown in FIG. 1. The hub may be comprised of a digital computer or memory bank with one communication interface for each of the communication sites (101–105). Minimally, the hub (110) must maintain information regarding the current and anticipated future availability of communication services at the communication sites. In other alternative embodiments, the hub may control the availability of services in the communication sites or provide other related services to the communication sites, such as user authorization. Thus the hub (110) may provide information regarding the temporal span and location that a particular communication service or set of communication services could be available to a communication unit (120).

In one embodiment, the user of the communication unit (120), upon finding that a desired communication service is not currently available within the service area of its current communication site (102), may initiate an inquiry into the system regarding the possible availability of the desired service in another location and/or at another time. This inquiry may take the form of a control message transmitted to the current communication site (102). The communication site then queries the hub (110) regarding availability of the desired service as determined upon reference to its data records. The hub returns a message to the communication site (102) indicating details of the availability of the desired service. These details may include location information, such as geographic coordinates or communication site identifiers, as well as time information, indicating where and when the desired service could be accessed by the communication unit (120). The communication site (102) then appropriately formats the information into a control message suitable for RF transmission to the communication unit (120), where it is then displayed to the user.

The hub (110) may provide the availability information based on information provided by each communication site (101–105) and stored in the hub. Alternately, the information may be gathered as needed by polling each of the appropriate connected communication sites (101–105). This may be appropriate when the availability information depends on the specific communication unit (120) which placed the request or when such requests are relatively infrequent.

In yet another embodiment, when the connected communication site comprises a substantially independent system, such as a cellular system (105), the hub (110) may relay the request for information to the cellular system hub (130) for subsequent processing. The response received at the hub (110) from the cellular hub (130) is then relayed by the hub to the communication site for transmission to the requesting communication unit (120). Thus the hub (110) operates to appropriately route information from the connected cellular system hub (130) to the communication unit (120).

In another embodiment of the invention, the communication unit (120) may be enabled to retain certain information regarding communication service availability for future use. For example, the circumstances (time and location) relating to the last use of a given service may be stored within the communication unit (120). Other availability information may be retained from inquiries such as that previously described. This stored information may then be presented to the user of the communication unit (120) when required. The user may then choose whether to accept the information or to initiate an inquiry for more information. For example, if the information is known to be substantially old, the user may desire to have more current information presented.

In another embodiment of the invention, the communication unit (120) may be enabled to request appropriate information regarding the availability of various communication services in advance of its intended use of such services. Further, the communication unit (120) may indicate in its request specific constraints on the time and/or location that a service will be required. For example, the user of the communication unit (120) in FIG. 1 may know in advance that it will be travelling to within the coverage area of communication site 5 (105). She may then request information regarding the availability of a desired communication service in Site 5.

Figure 2:
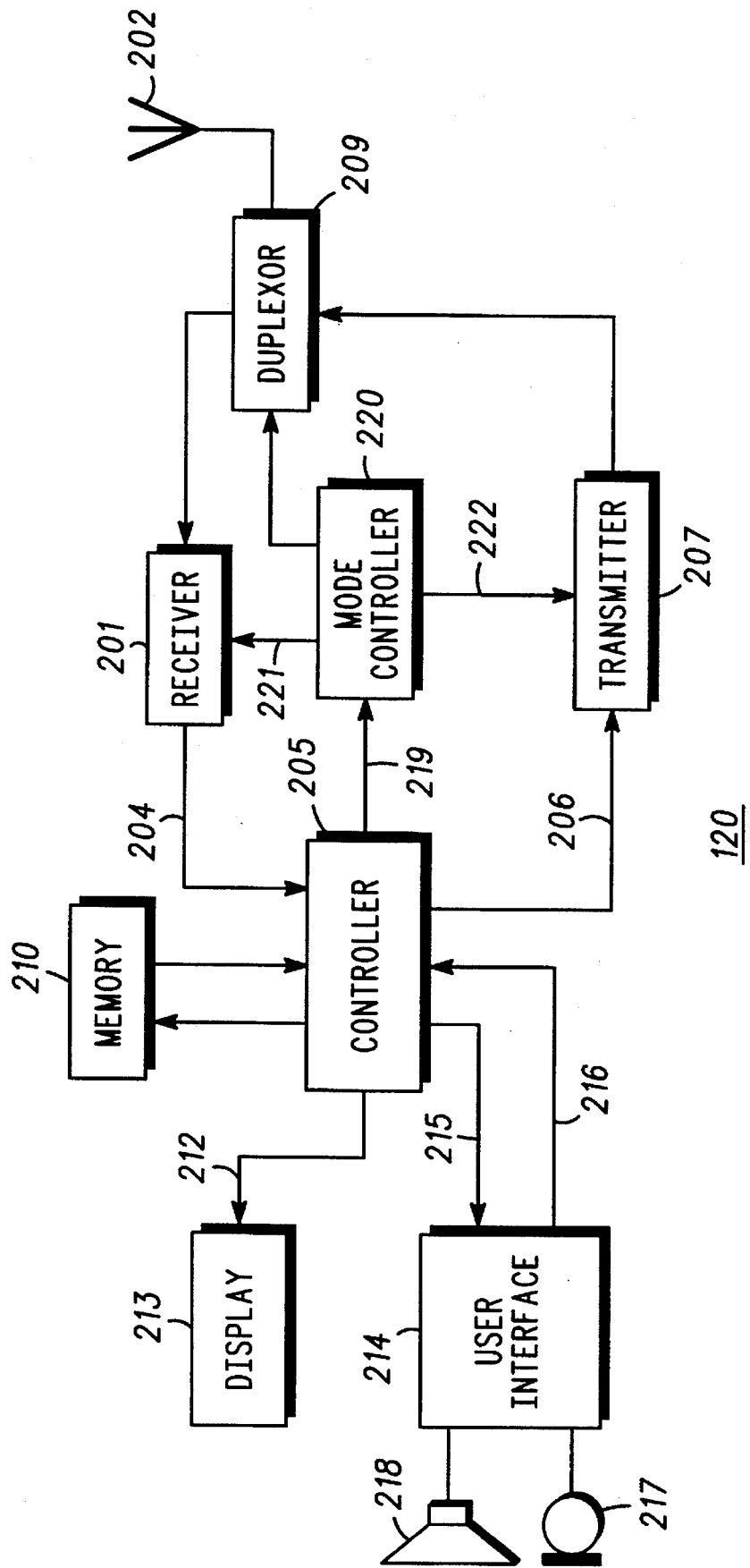
FIG. 2 comprises a block diagram of a communication unit of the communication system of FIG. 1.

Referring to FIG. 2, the communication unit (120) includes an RF receiver (201) that couples to an appropriate antenna (202) via a duplexer (209) to receive RF communication signals and describe above and provide a received signal (204). Received signal (204) are applied to a controller (205). The controller (205) operates on the received signal (204) in a known manner to separate the user and control data portions of the received signal (204). The user data signal (215) is applied to a user interface (214), which in the preferred embodiment processes the user data signal and routes appropriate signals to a speaker (218) to be rendered audible. In other embodiments, the user interface (214) may operate to process signals associated with alternate user input and output devices such as data terminals and displays, voice recognizers, or combinations thereof. The user interface (214) could also include, for example, a keyboard to allow a user to enter information regarding a specific desired service, such a telephone interconnect, dispatch, encryption, site-to-site coverage, private call, and others.

Audio signals to be transmitted are routed from a microphone (217) to the user interface (214) for processing. The user interface may comprise a digital signal processor that transforms the audio signals into digital information, hereafter referred to as transmit user data (216). The transmit user data (216) is applied to the controller (205) which appropriately adds control information to the transmit user data (216) and provides a transmit signal (206). The transmit signal (206) is applied to a well known RF transmitter (207) which appropriately modulates and amplifies the transmit signal (206) for transmission by the antenna (202) via the duplexer (209).

The controller (205) is the heart of the communication device and operates to control the many circuits comprising the communication unit (120). The controller provides a mode control signal (219) to a mode controller (220) which operates to control the receiver (201) and the transmitter (207) via a receiver control signal (221) and a transmitter control signal (222), respectively. These signals cause the receiver (201) and the transmitter (207) to operate in a manner compatible with the RF communication requirements of the current communication site (101–105). Likewise the mode controller operates to control the duplexer (209) (which may comprise a duplexing filter apparatus or a transmit/receive switch, as appropriate). The controller (205) may also apply display information (212) to a display (213). The display (213) serves as an output device for providing availability information to the user, and in the preferred embodiment would comprise an alphanumeric display device. A memory (210) operates to store information regarding communication service availability. The controller (205) may write new availability information into the memory (210) and may also read previously stored information from the memory (210).

Figure 3:
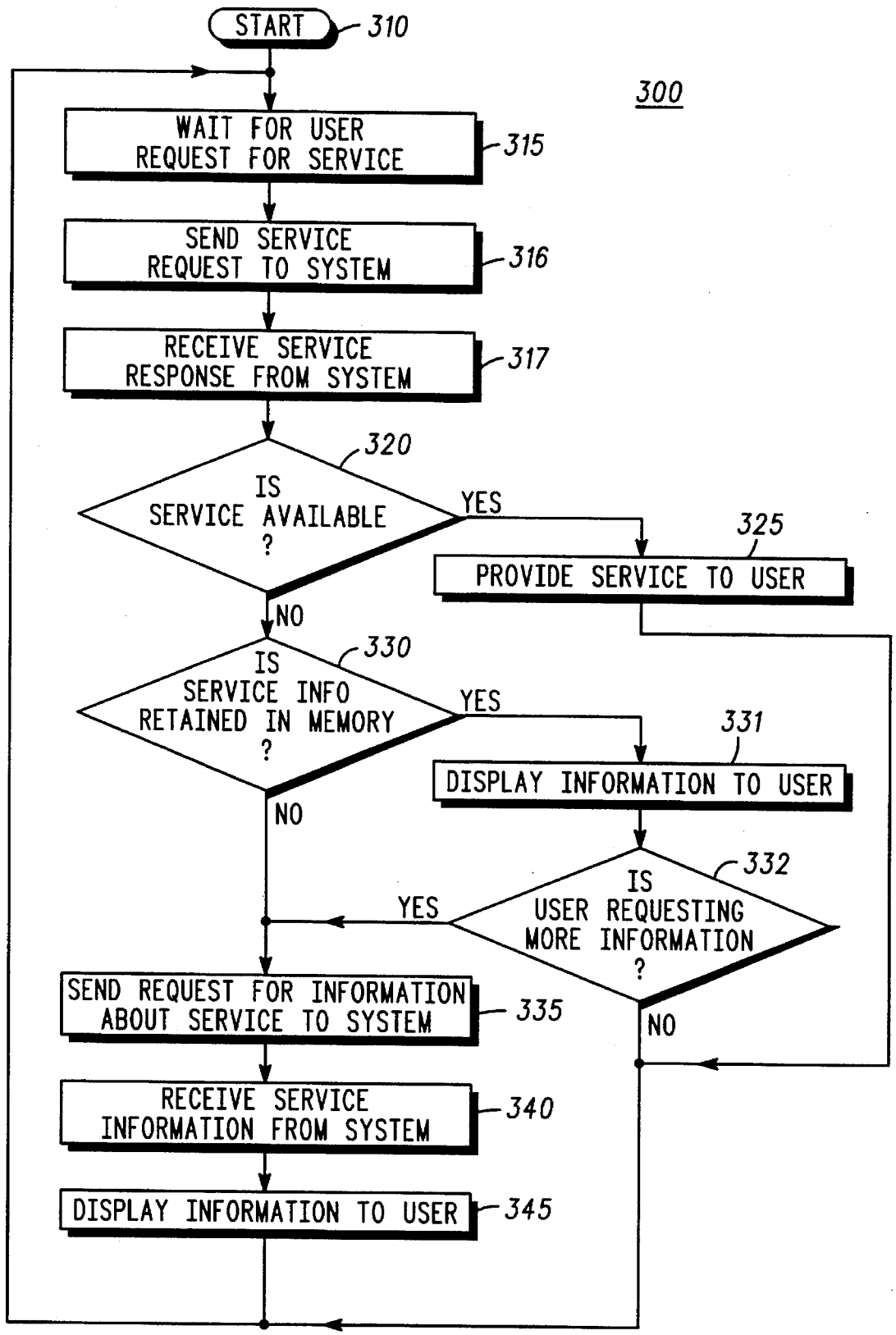
FIG. 3 is an operation flow chart of the communication unit of FIG. 2 according to the present invention.

Referring to FIG. 3, the operation of an exemplary communication unit (120) is described in conjunction with a flow chart (300). When the communication unit (120) initiates (310), it begins in an idle state, waiting for the user of the communication unit (120) to initiate a service request (315). Upon detecting a service request, the communication unit (120) first operates to determine if the requested communication service is available. A service request message (316) is sent to the communication site (101–105). (In an alternate embodiment, information stored in the memory (210) may enable the communication unit (120) to determine the service availability without transmitting a service request message as described.) Presuming that a service request message is sent, a response to the service request message is received (317). The response is examined (320) to determine if the requested communication service is currently available. If the service is available, the communication unit (120) operates appropriately to provide the service to the user (325).

If the requested communication service is not available, the communication unit memory (210) is examined to determine if any information regarding the availability of the requested communication service is stored therein (330). If such information is found in memory (210), it is appropriately formatted and output to the user via the display (213)

(331). After appropriately displaying the information, the user is polled to determine if additional information is desired (332). If no additional information is requested, the communication unit resumes the idle state (315). If additional information is requested, a request for information regarding availability of the requested communication service is sent to the communication site (101–105) (335). (This same function also executes if no information regarding the availability of the requested service is found in the memory (210) (330). Appropriate information regarding availability of the requested communication service is received from the communication system (100) via the current communication site (101–105) (340). The received information is appropriately formatted and output to the user via the display (213) (345), after which the communication unit returns to the idle state (315).

Accordingly, the present invention operates to provide information to the user of a communication unit (120) regarding the availability of various communication services in a plurality of communication sites (101–105) which together constitute a communication system (100).

What is claimed is:

1. A method of providing a radio communication unit with information regarding radio communication services, comprising the steps of:
   determining, by the radio communication unit that at least one specified radio communication service is not presently available;
   without requesting access to the at least one specified radio communication service, transmitting, from the radio communication unit, a status request regarding future availability of the at least one specified radio communication service for which the radio communication unit is currently authorized to use;
   receiving at the radio communication unit information, including details regarding future availability of the at least one specified radio communication service, wherein the information includes geographic location regarding other availability.

2. The method of claim 1, wherein the step of transmitting is performed when information regarding availability of the specific radio communication service is not currently retained by the radio communication unit.

3. A method of providing a radio communication unit with information regarding radio communication services, comprising the steps of:
   determining by the radio communication unit that at least one specified radio communication service is not presently available;
   without requesting access to the at least one specified radio communication service, transmitting, from the radio communication unit, a status request regarding future availability of the at least one specified radio communication service for which the radio communication unit is currently authorized to use;
   receiving at the radio communication unit information, including details regarding future availability of the at least one specified radio communication service, wherein the information includes temporal span regarding other availability.

4. The method of claim 3, wherein the step of transmitting is performed when information regarding availability of the specific radio communication service is not currently retained by the radio communication unit.

5. A method of providing a radio communication unit with information regarding radio communication services, comprising the steps of:

(a) determining that a need for a specific radio communication service exists;
   (b) determining that the specific radio communication service is not presently available;
   (c) determining whether any other information regarding availability of the specific radio communication service is currently retained by the radio communication unit;
   (d) when the other information is not available, transmitting, from the radio communication unit, a request regarding other availability of the specified radio communication service;
   (e) receiving at the radio communication unit information including details regarding the other availability of the specified radio communication service.

6. A method of providing a radio communication unit with information regarding radio communication services, comprising the steps of:
   (a) determining that a need for a specific radio communication service exists;
   (b) determining that the specific radio communication service is not presently available;
   (c) determining whether any other information regarding availability of the specific radio communication service is currently retained by the radio communication unit;
   (d) when the other information is currently retained by the radio communication unit, presenting the other information to a user of the radio communication unit;
   (e) when the other information is not available, transmitting, from the radio communication unit, a request regarding other availability of the specified radio communication service;
   (f) receiving at the radio communication unit information including details regarding the other availability of the specified radio communication service;
   (g) providing the information to the user of the radio communication unit.

7. A method of providing a radio communication unit with information regarding radio communication services, comprising the steps of:
   (a) determining that a need for a specific radio communication service exists;
   (b) determining that the specific radio communication service is not presently available;
   (c) determining whether any other information regarding availability of the specific radio communication service is currently retained by the radio communication unit;
   (d) when the other information is currently retained by the radio communication unit, presenting the other information to a user of the radio communication unit;
   (e) when either:
      the other information is not available; or
      the user commands; transmitting, from the radio communication unit, a request regarding other availability of the specified radio communication service;
   (f) receiving at the radio communication unit information, including details regarding the other availability of the specified radio communication service;
   (g) providing the information to the user of the radio communication unit.

8. A method of providing a radio communication unit with information regarding radio communication services, comprising the steps of:
   determining, by the radio communication unit, that at least one specified radio communication service is not presently available;

without requesting access to the at least one specified radio communication service, transmitting, from the radio communication unit, a status request regarding future availability of the at least one specified radio communication service for which the radio communication unit is currently authorized to use;

receiving at the radio communication unit information, including details regarding future availability of the at least one specified radio communication service.

9. The method of claim 8, wherein the information includes a geographic location where the at least one specified radio communication service is capable of being accessed by the radio communication unit.

10. The method of claim 8, wherein the information includes time information indicating when the at least one specified radio communication service is capable of being accessed by the radio communication unit.

11. The method of claim 8, wherein the step of transmitting is performed when information regarding availability of the specific radio communication service is not currently retained by the radio communication unit.

12. A method of providing a radio communication unit with information regarding radio communication services, comprising the steps of:

determining, by the radio communication unit, that at least one specified radio communication service is not presently available;

without requesting access to the at least one specified radio communication service, transmitting, from the radio communication unit, a status request regarding future availability of the at least one specified radio communication service for which the radio communication unit is currently authorized to use but is currently unavailable for use by the radio communication unit;

receiving at the radio communication unit information, including details regarding future availability of the at least one specified radio communication service.

13. The method of claim 12, wherein the information includes a geographic location where the at least one specified radio communication service is capable of being accessed by the radio communication unit.

14. The method of claim 12, wherein the information includes time information indicating when the at least one specified radio communication service is capable of being accessed by the radio communication unit.

15. The method of claim 12, wherein the step of transmitting is performed when information regarding availability of the specific radio communication service is not currently retained by the radio communication unit.

* * * * *